(12) United States Patent
Ahn et al.

(10) Patent No.: US 12,234,327 B2
(45) Date of Patent: Feb. 25, 2025

(54) ANHYDRIDE AND AROMATIC FUNCTIONALIZED POLYORGANOSILOXANES

(71) Applicants: Dow Silicones Corporation, Midland, MI (US); Dow Global Technologies LLC, Midland, MI (US)

(72) Inventors: Dongchan Ahn, Midland, MI (US); Zachary S. Kean, Bay City, MI (US); Thomas H. Peterson, Midland, MI (US)

( * ) Notice: Subject to any disclaimer, the term of this patent is extended or adjusted under 35 U.S.C. 154(b) by 443 days.

(21) Appl. No.: 17/608,603

(22) PCT Filed: Aug. 3, 2020

(86) PCT No.: PCT/US2020/044709
§ 371 (c)(1),
(2) Date: Nov. 3, 2021

(87) PCT Pub. No.: WO2021/026055
PCT Pub. Date: Feb. 11, 2021

(65) Prior Publication Data
US 2022/0213273 A1     Jul. 7, 2022

Related U.S. Application Data

(60) Provisional application No. 62/883,670, filed on Aug. 7, 2019.

(51) Int. Cl.
*C08G 77/00* (2006.01)
*C08L 83/06* (2006.01)

(52) U.S. Cl.
CPC .............. *C08G 77/80* (2013.01); *C08L 83/06* (2013.01)

(58) Field of Classification Search
CPC ................................ C08G 77/80; C08G 77/38
See application file for complete search history.

(56) References Cited

U.S. PATENT DOCUMENTS

| | | | |
|---|---|---|---|
| 7,279,223 B2 | 10/2007 | Rubinsztajn et al. | |
| 7,452,957 B2 | 11/2008 | Sayer | |
| 8,729,195 B2 | 5/2014 | Taniguchi et al. | |
| 2005/0129956 A1 | 6/2005 | Reuinsztajn et al. | |
| 2012/0309921 A1* | 12/2012 | Taniguchi | C08L 83/04 528/15 |

FOREIGN PATENT DOCUMENTS

| CN | 107955333 | * | 4/2018 |
|---|---|---|---|
| GB | 1407058 | | 4/1977 |

OTHER PUBLICATIONS

Crivello, Journal of Polymer Science: Part A: Polymer Chemistry, vol. 24, 1251-1279 (1986) (Year: 1986).*
Translation of CN107955333 (Year: 2018).*
Search Report from corresponding Chinese Application No. 202080055919.4 dated Feb. 2, 2023.

* cited by examiner

*Primary Examiner* — Robert C Boyle
(74) *Attorney, Agent, or Firm* — Steven W. Mork

(57) ABSTRACT

A polyorganosiloxanes has an anhydride functionality and an aromatic functionality, wherein a carbon of the aromatic functionality is separated from a carbon of a carbonyl group of the anhydride functionality by a carbon chain, wherein the polyorganosiloxane contains 5 weight-percent or more silicon atoms based on weight of the polyorganosiloxane.

9 Claims, No Drawings

ANHYDRIDE AND AROMATIC FUNCTIONALIZED POLYORGANOSILOXANES

BACKGROUND OF THE INVENTION

Field of the Invention

The present invention relates to anhydride-functional polysiloxanes, a method for making the anhydride-functional polysiloxane and compositions comprising the anhydride-functional polysiloxanes.

INTRODUCTION

Anhydride-functional polysiloxanes are useful, for example, in high value personal care application to introduce hydrophilic character to silicone products. The anhydride functionality also provides reactive functionality to a polyorganosiloxane due to their ability to hydrolyze to form carboxylic acid groups or react directly with amine or other functional groups in crosslinking reactions to form elastomers. Anhydride groups can be further functionalized by a variety of additional reactions, such as esterification and amination. Anhydride groups provide synthetic versatility in their ability to undergo condensation reactions with a wide range of polymers such as polyesters, polyamides, urethanes, and acrylics. Compounds, such as polyorganosiloxanes, containing anhydride groups are widely useful as intermediates due to their versatility in coupling reactions with other organic compounds.

The hydrophilic character of anhydride-functional polyorganosiloxanes can also create challenges. For example, anhydride-functional polyorganosiloxanes tend to lack compatibility with organic compounds with which it is desirable to blend and react, organic compounds such as styrenics, epoxies, polycarbonates, polyesters, polyamides, polyimides, urethanes and acrylics. As a result, it can be difficult to mix the polyorganosiloxanes with these types of organic compounds in an effort to form a uniform reaction mixture.

It would be desirable to identify an anhydride-functional polyorganosiloxane that also contains functional groups that render the compound more compatible with organic compounds such as styrenics, epoxies, polycarbonates, polyesters, polyamides, polyimides, urethanes and acrylics. It would be particularly desirable to identify anhydride-functional polyorganosiloxanes that have aromatic functionality, as well as a way to prepare such polyorganosiloxanes. Even more desirable would be to identify an anhydride-functional polyorganosiloxane that has aromatic functionality separated from a carbon of a carbonyl (—C=O) group of an anhydride functionality by a carbon chain, preferably a carbon chain having three or fewer non-aromatic carbon atoms and preferably two or more non-aromatic carbon atoms.

BRIEF SUMMARY OF THE INVENTION

The present invention provides an anhydride-functional polyorganosiloxane that also contains functional groups that render the compound more compatible with organic compounds such as styrenics, epoxies, polycarbonates, polyesters, polyamides, polyimides, urethanes and acrylics. The present invention provides anhydride-functional polyorganosiloxanes that also have aromatic functionality, as well as a way to prepare such polyorganosiloxanes. The present invention provides an anhydride-functional polyorganosiloxane that has aromatic functionality separated from a carbonyl carbon of an anhydride functionality by a carbon chain, even a carbon chain with three or fewer non-aromatic carbon atoms and at the same time two more non-aromatic carbon atoms.

The present invention is a result of discovering a free radical reaction for combining anhydride functionality with an alkenyl-functional polyorganosiloxane that when done in the presence of an aromatic compound that has an alpha-hydrogen atom and/or an aromatic free radical initiator and/or aromatic photoinitiator is aromatic surprisingly incorporates aromatic functionality onto the polyorganosiloxane in the same reaction as it incorporates anhydride functionality—and does so by incorporating the aromatic group within three carbon-carbon single bonds from a carbonyl group of the anhydride functionality. The free radical reaction can be a one-pot reaction where all components are included together at the time of reaction.

In a first aspect, the present invention is a polyorganosiloxane having an anhydride functionality and an aromatic functionality, wherein a carbon of the aromatic functionality is separated from a carbon of a carbonyl group of the anhydride by a carbon chain (preferably a carbon chain of 3 or fewer, or 2 or fewer non-aromatic carbon atoms while at the same time one or more, preferably 2 or more non-aromatic carbon atoms), wherein the polyorganosiloxane contains 5 weight-percent or more silicon atoms based on weight of the polyorganosiloxane.

In a second aspect, the present invention is a process for making the polyorganosiloxane of the first aspect, the process comprising: (a) combining (i) an unsaturated organosiloxane, (ii) an unsaturated anhydride compound; (iii) a free radical initiator or photoinitiator; and (iv) a solvent; and (b) initiating a free radial reaction by triggering the free radical initiator or photoinitiator; wherein the solvent is an aromatic compound that has an alpha-hydrogen atom and/or wherein the free radical initiator and/or photoinitiator is aromatic.

In a third aspect, the present invention is a curable composition comprising: (a) the polyorganosiloxane of the first aspect; and (b) an organopolysiloxane containing an average of at least two silicon-bonded amine or two-silicon bonded epoxy groups per molecule.

The polyorganosiloxane of the present invention is useful, for example, in preparing curable compositions of the present invention.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International; EN refers to European Norm; DIN refers to Deutsches Institut für Normung; and ISO refers to International Organization for Standards.

Materials identified only by a product name or tradename refer to the material sold under that product name or tradename at the priority filing date of this document unless otherwise stated herein.

"Multiple" means two or more. "And/or" means "and, or as an alternative". All ranges include endpoints unless otherwise indicated.

Designations of the type: "$C_{x-y}$" refer to having x or more and y or fewer carbon atoms.

"Non-aromatic" carbons are carbon atoms that are not part of an aromatic ring. "Aromatic" carbons are carbon atoms that are part of an aromatic ring. "Non-aromatic" carbon bonds are bonds between non-aromatic carbons.

Polysiloxanes comprise multiple siloxane units. Polyorganosiloxanes comprise multiple siloxane units wherein one or more siloxane unit includes an organic functionality. Siloxane units are characterized generally by the designation M, D, T and Q. M generally refers to a siloxane unit having the formula "$R_3SiO_{1/2}$". D generally refers to a siloxane unit having the formula $R_2SiO_{2/2}$". T generally refers to a siloxane unit having the formula $RSiO_{3/2}$". Q refers to a siloxane unit having the formula "$SiO_{4/2}$". R is usually independently in each occurrence selected from a group consisting of hydrogen, hydroxyl, alkoxy, or any carbon-bound substituent, including alkyls (such as methyl, ethyl, propyl, butyl, pentyl, and hexyl), substituted alkyls such as trifluoropropyl and nonafluorohexyl, alkenyls (such as vinyl, allyl, and hexenyl), phenyls and substituted phenyls, and "OZ" groups where O corresponds to oxygen and Z corresponds to a component selected from a group consisting of metal cations, alkyls, substituted alkyls, and hydrogen. A "polyorganosiloxane" is a polysiloxane where at least one R group is an organic moiety. Notably, an oxygen atom having a multiple of "½" subscript indicates that the oxygen bridges the specified atom to a second atom where the second atom is also specified with an oxygen having a multiple of "½" subscript. For example, "$(SiO_{4/2})(HO_{1/2})$" refers to a Q-type group with a silicon atom bound through a single oxygen to a hydrogen.

"Pendant" means extending off from. So a group pendant from a silicon atom of a polysiloxane is a group extending off from any silicon atom in the polysiloxane. A "terminal pendant" expanding from a silicon atom of a polysiloxane is a group extending off from a silicon atom of an M siloxane unit.

The polyorganosiloxane of the present invention is, in its broadest scope, not limited as to the siloxane units it comprises. In that regard, the polyorganosiloxane can comprise one or any combination of more than one siloxane unit selected from a group consisting of M, D, T and Q siloxane units. For example, the polyorganosiloxane can comprise M and D units and can be free of siloxane units other than M and D units. As an alternative example, the polyorganosiloxane can comprise M and Q units and be free of siloxane units other than M and Q units. As yet another alternative example, the polyorganosiloxane can comprise M, D and T units and be free of siloxane units other than M, D and T. The polyorganosiloxane of the present invention contains 5 weight-percent (wt %) or more, preferably 7.5 wt % or more, and can comprise 10 wt % or more silicon atoms based on the weight of the polyorganosiloxane. Determine wt % silicon in the polyorganosiloxane from the molecular weights of the atoms making up the polyorganosiloxane if the structure of the polyorganosiloxane is known. If the structure of the polyorganosiloxane is not known, the wt % silicon can be determined using the following formula:

$$Wt\% \ Si = 100*(n_{si}*28.09)/\Sigma_i^Z(n_i*M_i)$$

Where $n_{si}$ is the number of silicon atoms in an average structure of the organopolysiloxane as determined by nuclear magnetic resonance spectroscopy techniques, gel permeation chromatography techniques and/or gas chromatography-mass spectrometry techniques, the constant 28.09 is the atomic mass of silicon (in Daltons), $n_i$ and $M_i$ are the number of atoms of species i present in the average structure of the organopolysiloxane and the atomic mass of species i (in units of Daltons). The summation range covers the total number of unique species present in the average structure of the organopolysiloxane such that the summation equals the total formula weight of the average structure of the organopolysiloxane.

Preferably, pendant groups extending off from a silicon atom that do not contain both an anhydride functionality and an aromatic functionality contain 8 carbons or fewer and can contain 7 carbons or fewer, even 6 carbons or fewer.

The polyorganosiloxane of the present invention has both an anhydride functionality and an aromatic functionality.

An anhydride functionality has the following structure: —C(=O)—O—C(=O)—. The anhydride functionality can be, and desirably is, a cyclic anhydride where the single bonded oxygen and carbonyl carbon are part of a ring of bonded atoms such as in maleic anhydride. One desirably polyorganosiloxane of the present invention comprises a maleic anhydride remnant—that is, the components of a maleic anhydride molecule that remain after reacting the carbon-carbon double bond in a vinyl polymerization:

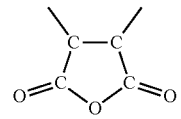

The aromatic functionality is a hydrocarbon, or substituted hydrocarbon, having a cyclic structure of bonded carbons with delocalized pi electrons around the carbons of the cyclic structure (an aromatic ring). Herein, aromatic functionality and aromatic ring are interchangeable. A phenyl group is one example of an aromatic functionality. The aromatic functionality can be substituted, meaning moieties may be bonded to and pendant from the carbon atoms forming the aromatic ring. For example, a tolyl group and a benzyl group are examples of substituted aromatic functionalities having a methyl group or methylene group bonded to and pendant from a carbon atom forming the aromatic ring. Desirably, the aromatic functionality is monocyclic, meaning there is only one aromatic ring forming the aromatic functionality (as opposed to, for instance, a naphthalene group that comprises two aromatic rings).

A carbon of the aromatic functionality is separated from a carbon of a carbonyl group of the anhydride functionality by a non-aromatic carbon chain. That means that the carbon of a carbonyl group of the anhydride functionality is bonded to a carbon that is directly or indirectly through other non-aromatic carbon bonds, bound to a carbon atom in the aromatic ring of the aromatic functionality. For example, a maleic anhydride remnant can be bonded to the methylene carbon of a benzyl group to form a moiety having a carbonyl carbon of the anhydride functionality separated from a carbon of the aromatic functionality by two carbons. Desirably, the carbon chain is one or more non-aromatic carbon and can be two or more non-aromatic carbons while at the same time is desirably, 6 or fewer non-aromatic carbons, 5 or fewer non-aromatic carbons, 4 or fewer non-aromatic carbons, 3 or fewer non-aromatic carbons, or even 2 or fewer non-aromatic carbons. Determine the number of non-aromatic carbons separating an aromatic carbon in the aromatic functionality from a carbonyl carbon of the anhydride functionality preferably from the reaction expected from the reactants forming the polyorganosiloxane. Additionally, or alternatively, determine the number of carbons separating the aromatic functionality from the carbonyl carbon of the anhydride functionality by $^{13}$C and $^{1}$H nuclear magnetic resonance (NMR) analysis.

Typically, the anhydride functionality and the aromatic functionality are on the same pendant group extending from a single silicon atom of the polyorganosiloxane. Generally, when the anhydride functionality and aromatic functionality are on the same pendant group extending from a single silicon atom of the polyorganosiloxane, the aromatic functionality is more remote from the silicon atom along the pendant moiety than the anhydride functionality. Additionally, the anhydride functionality can be separated from the silicon atom to which it is bonded by a carbon chain, preferably a hydrocarbon chain. Typically, the carbon chain separating the silicon atom and the closest carbonyl carbon of the anhydride functionality has a length of 2 carbons or more, preferably 3 carbons or more while at the same usually is 8 carbons or fewer, 7 carbons or fewer, 6 carbons or fewer, 5 carbons or fewer, 4 carbons or fewer, or even 3 carbons or fewer.

The polyorganosiloxane of the present invention is a result of discovering a particular reaction process to make polyorganosiloxanes with both anhydride and aromatic functionality. The process comprises: (a) forming a reactive composition by combining: (i) an unsaturated polyorganosiloxane; (ii) an unsaturated anhydride compound; (iii) a free radical initiator and/or a photoinitiator; and (iv) a solvent; and (b) initiating a free radical reaction by triggering the free radical initiator and/or photoinitiator. Surprisingly, it has been discovered such a process results in a free radical reaction that incorporates both an anhydride compound and an aromatic component onto the polyorganosiloxane. When the initiator is aromatic it can become bound onto the polyorganosiloxane as it initiates the free radical reaction. Generally, the reaction is run with a relatively low initiator concentration so it is desirable to run the reaction in an aromatic solvent where the aromatic solvent has an alpha hydrogen to provide a higher concentration of aromatic molecules that can incorporate into the polyorganosiloxane. It is thought that an alpha-hydrogen of the solvent is removed to create a radical that allows the solvent molecule to participate (even initiate) free radical reaction with the unsaturated groups on the other components.

The unsaturated polyorganosiloxane is a polyorganosiloxane comprising on average one or more than one pendant unsaturated group per molecule, typically bound to a silicon atom. The pendant unsaturated group usually contains 6 carbons or fewer (for example, hexenyl), 5 carbons or fewer, 4 carbons or fewer, three carbons or fewer (for example, allyl) and can contain two carbons or fewer (vinyl group). Desirably, the pendant unsaturated group is a terminally unsaturated alkenyl group, which means the pendant unsaturated group has a carbon-carbon double bond between a terminal carbon and an adjacent carbon at the end of a carbon chain remote from where the hydrogen atom would have been removed to form the alkenyl group from a corresponding alkene group. For example, allyl groups are terminally unsaturated alkenyl groups. For avoidance of doubt, vinyl groups are also considered terminally unsaturated alkenyl groups. Desirably, the pendant unsaturated group is selected from a group consisting of vinyl, allyl, hexenyl groups; more preferably vinyl and ally groups; most preferably is vinyl.

The unsaturated polyorganosiloxane is, in its broadest scope, not limited as to the siloxane units it comprises. In that regard, the polyorganosiloxane can comprise one or any combination of more than one siloxane unit selected from a group consisting of M, D, T and Q siloxane units. The unsaturated polyorganosiloxane contains 5 wt % or more, preferably 7.5 wt % or more, and more preferably 10 wt % or more silicon atoms based on the weight of the polyorganosiloxane. Determine wt % silicon in the polyorganosiloxane as described above. Preferably, pendant groups extending off from a silicon atom contain 8 carbons or fewer and can contain 7 carbons or fewer, even 6 carbons or fewer. The polyorganosiloxane can comprise or be free of silanol groups, but typically at a concentration of 5 wt % or less, preferably 4 wt % or less, 3 wt % or less, 2 wt % or less, even one wt % or less based on polyorganosiloxane weight. Determine concentration of silanol group by $^{29}$Si NMR.

Examples of suitable unsaturated polyorganosiloxanes include any one or any combination of more than one polyorganosiloxane selected from a group consisting of: ViMe$_2$SiO$_{1/2}$(Me$_2$SiO$_{1/2}$)$_a$O$_{1/2}$SiMe$_2$Vi, ViMe$_2$SiO$_{1/2}$(MeViSiO$_{1/2}$)$_b$O$_{1/2}$SiMe$_2$Vi, Me$_3$SiO$_{1/2}$(MeViSiO$_{1/2}$)$_b$O$_{1/2}$SiMe$_3$, ViMe$_2$SiO$_{1/2}$(Me$_2$SiO$_{1/2}$)$_a$(MeViSiO$_{1/2}$)$_b$O$_{1/2}$SiMe$_2$Vi, HexMe$_2$SiO$_{1/2}$(Me$_2$SiO$_{1/2}$)$_a$O$_{1/2}$SiMe$_2$Hex, HexMe$_2$SiO$_{1/2}$(MeHexSiO$_{1/2}$)$_b$O$_{1/2}$SiMe$_2$Hex, Me$_3$SiO$_{1/2}$(MeHexSiO$_{1/2}$)$_b$O$_{1/2}$SiMe$_3$, and HexMe$_2$SiO$_{1/2}$(Me$_2$SiO$_{1/2}$)$_a$(MeHexSiO$_{1/2}$)$_b$O$_{1/2}$SiMe$_2$Hex; where Me, Vi and Hex denote methyl, vinyl and hexenyl respectively and a and b designate the average number of the associated siloxane units per molecule and are selected such that the viscosity of the polyorganosiloxane is 0.001 Pascal*seconds (Pa*s) or more and 100,000 Pa*s or less at 25 degrees Celsius (° C.) as determined by the viscosity test method presented below prior to examples.

The unsaturated organopolysiloxane is typically present at a concentration of 15 wt % or more, preferably 20 wt % or more while at the same time is typically 98 wt % or less, more typically 95 wt % or less, 90 wt % or less, 75 wt % or less, even 50 wt % or less based on composition weight. On a solid's basis (excluding solvents), the amount of unsaturated organopolysiloxane is typically 30 wt % or more, preferably 60 wt % or more and more preferably 70 wt % or more while at the same time is typically 99 wt % or less, preferably 97 wt % or less and more preferably 93 wt % or less of the composition solids weight (composition excluding solvent).

The unsaturated anhydride compound has both anhydride functionality and a carbon-carbon double or triple bond. Examples of suitable unsaturated anhydride compounds include any one or any combination of more than one selected from a group consisting of maleic anhydride, substituted maleic anhydride, alkenylsuccinic anhydrides, polyisobutylenylsuccinic anhydride, citraconic anhydride, bromomaleic anhydride, crotonic anhydride, diphenic anhydride, isatoic anhydride, itaconic anhydride, phenylmaleic anhydride, nadic anhydride, 3-(but-3-enyl)-1,2,3,6-tetrahydrophthalic anhydride, and cis-1,2,3,6-tetrahydrophthalic anhydride, phenylsuccinic anhydride, and unsaturated anhydrides featuring bridged heterocylic structures (such as bicyclooctenedicarboxylic anhydrides such as CAS 6708-37-8, bicyclooctenetetracarboxylic dianhydrides such as bicyclo[2,2,2]oct-7-ene-2,3,5,6-tetracarboxylic dianhydride (CAS 1719-83-1), ethenocyclobutabenzofuran-triones such as CAS 55054-47-2, and ethenocycloheptafuran-diones such as CAS 5650-01-1 and their isomeric variants). Desirably, the unsaturated anhydride is selected from maleic anhydride and substituted maleic anhydrides. Substituted maleic anhydride is a maleic anhydride where one or both hydrogen atoms on the carbons of the carbon-carbon double bond have been replaced with another moiety, such as a hydrocarbon or substituted hydrocarbon. Desirably, reactive composition is free of phthalic anhydride The amount of unsaturated anhydride is generally present at a concentration of 0.1 mole or more, 0.25 mole or more, 0.5 mole or more, while at the same time is typically present at a concentration of 10 moles or fewer, 5 moles or fewer and even 1.5 moles or fewer per moles of pendant ethylenically unsaturated group in the unsaturated polyorganosiloxane.

The free radical initiator can be, for example, any one or combination of more than one component selected from a group consisting of benzoyl peroxide, tert-butyl peroxide, dicumyl peroxide, lauroyl peroxide, peracetic acid, cyclohexanone peroxide, cumene hydroperoxide, tert-butyl peroxide, tert-butyl hydroperoxide, 2,2'-azobisisobutyronitril (AIBN), 2,2'-azodi(2-methylbutyronitrile) (AMBN), tert-amyl peroxybenzoate, tert-butyl peracetate, tert-butyl peroxybenzoate, tert-butylperoxy isopropyl carbonate, cumene hydroperoxide and potassium persulfate. The amount of free radical initiator is typically 0.01 wt % or more and can be 0.15 wt % or more, even 0.2 wt % or more and at the same time typically 10 wt % or less, preferably 5 wt % or less and can be 3 wt % or less based on composition weight.

The photointiator can be, for example, any one or any combination of more than one component selected from a group consisting of onium salts, nitrobenzyl sulfonate esters, diaryliodonium salts of sulfonic acids, triarylsulfonium salts of sulfonic acids, diaryliodonium salts of boronic acids, triarylsulfonium salts of boronic acids, bis-diaryl iodonium salts (such as bis(dodecyl phenyl) iodonium hexafluoroarsenate and bis(dodecylphenyl) iodonium hexafluoroantimonate), dialkylphenyl iodonium hexafluoroantimonate, diaryliodonium salts of sulfonic acids, triarylsulfonium salts of sulfonic acids, diaryliodonium salts of boronic acids, and triarylsulfonium salts of boronic acids. Preferred diaryioadonium salts of sulfonic acid are selected from diaryliodonium salts of perfluoroalkylsulfonic acids and diaryliodonium salts of aryl sulfonic acids. Preferred diaryliodonium salts of perfluoroalkylsulfonic acids include diaryliodonium salts of perfluorobutanesulfonic acid, diaryliodonium salts of perfluoroethanesulfonic acid, diaryliodonium salts of perfluoro-octanesulfonic acid, and diaryliodonium salts of trifluoromethane sulfonic acid. Preferred diaryliodonium salts of aryl sulfonic acids include diaryliodonium salts of para-toluene sulfonic acid, diaryliodonium salts of dodecylbenzene sulfonic acid, diaryliodonium salts of benzene sulfonic acid, and diaryliodonium salts of 3-nitrobenzene sulfonic acid. Preferred triarylsulfonium salts of sulfonic acid are selected from triarylsulfonium salts of perfluoroalkylsulfonic acids or triarylsulfonium salts of aryl sulfonic acids. Preferred triarylsulfonium salts of perfluoroalkylsulfonic acids include triarylsulfonium salts of perfluorobutanesulfonic acid, triarylsulfonium salts of perfluoroethanesulfonic acid, triarylsulfonium salts of perfluoro-octanesulfonic acid, and triarylsulfonium salts of trifluoromethane sulfonic acid. Preferred triarylsulfonium salts of aryl sulfonic acids include triarylsulfonium salts of para-toluene sulfonic acid, triarylsulfonium salts of dodecylbenzene sulfonic acid, triarylsulfonium salts of benzene sulfonic acid, and triarylsulfonium salts of 3-nitrobenzene sulfonic acid. Preferred diaryliodonium salts of boronic acids include diaryliodonium salts of perhaloarylboronic acids and preferred triarylsulfonium salts of boronic acids are the triarylsulfonium salts of perhaloarylboronic acid.

The combined concentration of free radical initiator and photoinitiator is typically 0.01 wt % or more, 0.1 wt % or more, 0.15 wt % or more, 0.2 wt % or more, 0.4 wt % or more, 0.6 wt % or more, 0.8 wt % or more, or even 1.0 wt % or more while at the same time is typically 10 wt % or less, 5 wt % or less, or preferably 4 wt % or less based on the combined weight of unsaturated polyorganosiloxane, unsaturated anhydride and solvent.

The solvent is desirably, though not necessarily, a liquid (at 25° C.) that dissolves at least one, preferably all of the components of the reactive composition.

Desirably, the solvent is an aromatic solvent having an alpha-hydrogen atom, The aromatic solvent having an alpha-hydrogen atom is in its broadest scope any aromatic solvent having a hydrogen bonded to a non-aromatic carbon, where the non-aromatic carbon is bonded to a carbon in the aromatic ring. A non-aromatic carbon is one that is not a member of the aromatic ring. Examples of aromatic solvents having an alpha-hydrogen include any one or combination or more than one selected from a group consisting of toluene, ethylbenzene, 1,2-dimethylbenzene (o-xylene), 1,3-dimethylbenzene (m-xylene), 1,4-dimethylbenzene (p-xylene), 1,2,4-trimethylbenzene, 1, 3, 5-trimethylbenzene, 1,2, 3-trimethylbenzene, and substituted versions of any of these. Preferably, the aromatic solvent is selected from toluene, isomers of xylene, and combinations thereof.

The solvent can be dried prior to use by common desiccating procedures such as by contacting the solvent with molecular sieves, silica gel, or other chemical desiccants, or by sparging with a dry inert gas.

Typically, the concentration of solvent is 5 wt % or more, preferably 10 wt % or more, and can be 15 wt % or more while at the same time is typically 95 wt % or less, 90 wt % or less or even 60 wt % or less relative to composition weight Initiate reaction of the reactive composition to form the polyorganosiloxane of the present invention by triggering the free radical initiator and/or photoinitiator. Triggering causes the free radical initiator and/or photoinitiator to form a free radical. Method for triggering free radical initiators and photoinitiators are known in the art. Often, heating free radical initiators above a trigger temperature triggers free radical initiators and exposing photoinitiators to specific triggering wavelengths of radiation trigger photoinitiators. It is also possible to multi-component schemes that trigger upon mixing without heat or irradiation, such as use of redox catalysts for free radical initiators.

Polyorganosiloxanes of the present invention are particularly useful as components in curable compositions that comprise: (a) the polyorganosiloxane having an anhydride functionality and an aromatic functionality; and (b) an organopolysiloxane containing an average of at least two silicon-bonded amine or two-silicon bonded epoxy groups per molecule. Desirably, the curable composition contains a molar ratio of anhydride functionality to either amine or epoxy groups that is 10 or less, 5 or less, 2 or less, 1.5 or less, 1.2 or less or even one or less while at the same time is typically 0.1 or more, 0.2 or more, 0.5 or more, or 0.7 or more.

Component (b) can be linear, branched or resinous. The amine groups and epoxy groups typically have 2 or more carbon atoms and at the same time generally have 18 or fewer, even 15 or fewer carbon atoms. The amine and epoxy groups are pendant from a silicon atom, and can be terminally pendant (extending from the silicon atom of an M siloxane unit).

Examples of suitable amine groups that can be pendant include monovalent amine groups such as 3-aminopropyl, 2-aminoethyl, aminomethyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups. In some embodiments, the amine group may be selected from tertiary amine groups, such as bis(2-hydroxyethyl)-3-aminopropyl, N,N-dimethyl-3-aminopropyl, N,N-diethyl-3-aminopropyl, and N,N-diethylaminomethyl. In some embodiments, the amine group may be selected from aminoalkyl groups having the formula R'—(NH-A')$_q$-NH-A-, wherein A and A' are each independently a linear or branched alkylene group having 1 to 6 carbon atoms and optionally containing an ether linkage; q=0-4; R' is hydrogen or an alkyl or hydroxyalkyl group having 1 to 4 carbon atoms. Examples of such aminoalkyl groups include, but are not limited to, —(CH$_2$)$_3$NH$_2$, —(CH$_2$)$_4$NH$_2$, —(CH$_2$)$_3$NH(CH$_2$)$_2$NH$_2$, —CH$_2$CH(CH$_3$)CH$_2$NH(CH$_2$)$_2$NH$_2$, —(CH$_2$)$_3$NHCH$_2$CH$_2$NH(CH$_2$)$_2$NH$_2$, —CH$_2$CH(CH$_3$)CH$_2$NH(CH$_2$)$_3$NH$_2$, —(CH$_2$)$_3$NH(CH$_2$)$_4$NH$_2$, and —(CH$_2$)$_3$O(CH$_2$)$_2$NH$_2$.

Examples of suitable epoxy groups that can be pendant include examples where the epoxy groups are bonded to silicon atoms through alkylene groups, such that these epoxy groups are not directly bonded to the silicon atoms. The groups are exemplified by 3-(glycidoxy)propyl groups, 2-(glycidoxycarbonyl)propyl groups, 2-(3,4-epoxycyclohexyl)ethyl groups: and 2-(4-methyl-3,4-epoxycyclohexyl) propyl groups. Further examples of epoxy groups can include any C1-15 organic group as described above wherein an epoxy group is included. For example, 2,3-epoxypropyl, or 2,3-epoxypropoxy groups can be suitable epoxy-functional groups.

The curable composition can include or be free of any one or combination of more than one component in addition to those mentioned, including those selected from a group consisting of stabilizers, reinforcing fillers, extending fillers, siloxane resins, silane coupling agents, pigments, dyes, adhesion promoters, curing catalysts, accelerants and inhibitors.

Characterization Test Methods

Conduct Characterizations of Materials Using the Following Test Methods:

Molecular Weight. Determine number average molecular weight (Mn) and polydispersity (Mw/Mn) by gel permeation chromatography (GPC). Prepare samples in tetrahydrofuran at a concentration of 10 milligrams per milliliter, solvate one hour with occasional shaking and filter through a 0.45 micrometer polytetrafluoroethylene syringe filter prior to analysis. Use and injection volume of 100 microliters and collect data for 25 minutes. The chromatographic equipment is a Waters 2695 Separations Module and a Waters 2410 differential refractometer. Use two (300 millimeters by 7.5 millimeters) Polymer Laboratories PLgel 5 micrometer Mixed-C column (molecular weight separation range of 200-2,000,000) provided by a PLgel 5 micrometer guard column (50 millimeters by 7.5 millimeters). Perform analysis using certified grate tetrahydrofuran flowing at 1.0 milliliter per minute as the eluent and maintain columns and detector at 35° C. Perform data collection and analyses using ThermoLabsystems Atlas 8.3 chromatography software and Polymer Laboratories Cirrus 2.0 GPC software. Determine molecular weight averages relative to a 3$^{rd}$ order polynomial calibration curve crated using polystyrene standards covering the molecular weight range of 580-2,300,000 grams per mole.

Attenuated Total Reflectance Infrared (ATR-IR) Spectroscopy. Test samples at 23° C. using a Nicolet 6700 Fourier transform infrared (FTIR) spectrometer equipped with a Smart Miracle accessory having a zinc selenide crystal. Test liquid samples by placing two drops of the sample onto the crystal to ensure complete coverage of the crystal throughout the acquisition of 32 scans. Test solid samples by placing the solid sample in contact with the crystal. Keep contact pressure at a minimum to establish complete crystal contact, as determined by previewing the spectral quality to achieve the maximum signal to noise ratio.

Viscosity. Determine viscosity of samples with an Anton Paar MCR-301 cone and plate rheometer having a 25 millimeter diameter cone with a 1.988° angle, and 104 micrometer truncation. For all reaction products where solvent was present, first dry the samples in small quantities in an aluminum weighting dish for 2 hours as 150° C. in a convection oven to remove solvents prior to testing. Measure shear viscosity data for a given temperatures as the shear rate is steadily increased from 0.1 to 500 1/seconds (s$^{-1}$), in intervals of five data points per decade, and then decrease from 500 to 0.1 s$^{-1}$ to assess hysteresis. The time interval for each data point is 10 seconds to ensure achieving a steady-state viscosity. Samples should show little shear rate dependence over this range so the zero shear viscosity at 25° C. is the value at 10 s$^{-1}$ where there is good signal to noise ratio even with low viscosity control samples. Probe temperature dependence of viscosity using a thermal ramp from 25° C. to 150° C. at a rate of 5° C. per minute using a Peltier heating device purged with a mild sweep of dry compressed air, with automated compensation for thermal expansion of the tools. Measure points at approximately 4° C. intervals at a shear rate of 10 s$^{-1}$. Reverse the ramp upon reaching 150° C. and repeat measurements while cooling at the same rate of 5° C. per minute to test for hysteresis.

Nuclear Magnetic Resonance Spectroscopy (NMR).

For $^1$H NMR spectroscopy prepare samples by dissolving approximately 740 milligrams of sample in 3 grams of deuterated chloroform. Include 0.2 wt % dry acetonitrile as an internal reference where appropriate. Mix the solution on a vortex mixer and transfer one gram of the solution into a 5 millimeter glass Proton NMR tube and cap. Complete NMR analysis using an Agilent Technologies 400 megahertz NMR spectrometer at 25° C. with Varian 7600AS NMR Autosample.

For $^{13}$C NMR spectroscopy and $^{29}$Si NMR spectroscopy, prepare samples by dissolving approximately 740 milligrams of sample in 3 grams of deuterated chloroform. Mix 2 grams of the resulting solution with 60 volume-percent 0.02 molar Cr(acac)$_3$ in deuterated chloroform an analyze using a 15 millimeter silicon-free Wilmad polytetrafluoroethylene tube using Mercury 400 megahertz NMR spectrometer. Relaxation time is 13 seconds and number of transients is 256.

Perform quantitation of all NMR spectra using the manual integration feature of ACD Spectrus Process 2015 with uniform integration limits between spectra within a series after applying consistent phasing, internal referencing and baseline correction procedures. Determine the conversion of vinyl using $^1$H NMR by comparing the normalized integrals of the Si—CH=CH$_2$ triplet (5.75, 5.93, 6.12 ppm) in the unreacted (t=0) sample with the reaction products obtained at various times, or by 29 Si NMR using the integrated peaks in the M$^{Vi}$ (−4 ppm) and D$^{Vi}$ (−36 ppm) regions in analogous manner.

Non-Volatile Content (NVC). Place 2 grams of sample on a four-place balance in a pre-tared clean aluminum dish to determine the exact initial weight (Wi). Place the sample in either: (a) a force convection oven for 2 hours at 150° C. (forced air drying); or (b) a vacuum over for 2 hours at 90° C. under full vacuum of less than 10 Torr (10 millimeters of mercury) pressure (vacuum drying). Cool the sample to ambient temperature and measure a final weight (Wf). Determine NVC using the following formula:

$$NVC(\text{wt \%})=(1-(Wi-Wf)/(Wi))*100\%$$

Water Vapor Sorption. Load 6-10 milligrams of a sample that had been dried for 2 hours in a forced air convection oven at 150° C. onto a microbalance in a vapor sorption analyzer instrument (TA Instruments VTI-SA+). Expose the sample to controlled mixtures of a dry nitrogen gas stream and a humid water vapor stream generated by sweeping a nitrogen gas stream over a heated solvent cell that was filled with deionized water to generate various partial pressures of water vapor relative to saturation, in a range of 0.05 to 0.90 (5% to 90% relative humidity), at constant temperatures of 20° C. or 40° C. after first undergoing a drying step for 3 hours at 80° C. Following the drying step, increase the relative pressure (RP) isothermally in 2 hour intervals at 0.02, 0.2, 0.4, 0.6, 0.8 (for the 40° C. isotherms) and 0.9 (for the 20° C. isotherms) to measure a temporal (non-equilibrium) weight uptake of water at each relative pressure to record the absorption profile. Immediately step the sample back down from its maximum relative pressure step in 2 hour intervals at 0.6, 0.4, 0.2 and 0.02 relative pressures to measure a temporal weight uptake of water to record the desorption profile. Calculate the difference in weight uptake of water between the absorption and desorption curves at a relative pressure to give an estimate of the extent of hysteresis exhibited by the sample. Hysteresis is attributed to hydrolysis of the grafted anhydride functionality present in the sample.

Gas Chromatograph (GC)-Mass Spectrometer (MS) Analysis. For GC analysis use a Thermotrace 1310 Gas Chromatograph with a DB-5 column, 275° C. injector temperature, thermal gradient: (35° C. hold 2 minutes, ramp to 300° C. at 10° C. per minute and hold for 2 minutes), MS transfer line temperatures: (MS-280° C.; GC1-280° C.; GC2-280° C.), liquid injection, 0.1 microliter injection volume, 50 split ratio and 1.00 milliliter per minute flow. For MS analysis use a Thermo GC-Qexactive device, scan type is full scan and dd product ion scans (dd scans for Cl only), ionization types are EI, CI (pure ammonia gas), 50-700 m/z scan range, 60,000 resolution, profile spectral data type, 1E6 AGC target, 100 millisecond maximum injection time, 1.5 milliliters per minute reagent gas flow, 70 eV(EI) 120 eV(CI) energy and 2.0 or 8.0 minute filament on delay.

EXAMPLES

Table 1 identifies the polymer for use in the following Examples (Exs) and Comparative Examples (Comp Exs). Tetrahydrofuran, HPLC grade (THF), Deuterated chloroform (CDCl3), benzoyl peroxide (BPO), maleic anhydride (MA), methylene chloride, azobisisobutylonitrile (AIBN), and 2,2'-azodi(2-methylbutyronitrile (AMBN (Vazo 67)) are from Sigma-Aldrich. Anhydrous toluene and meta-xylene (m-xylene) are from Acros. Methyl isobutyl ketone (MIBK), para-xylene (p-xylene) and methyl ethyl ketone (MEK) are from MilliporeSigma.

TABLE 1

| Material | Identity |
|---|---|
| MM$^{vi}$ | Pentamethyl, vinyl disilsoxane. Product SIV9090.0 from Gelest. |
| Vi-PDMS1 | α,ω-dimethylvinylsiloxy-terminated polydimethylsiloxane having a zero shear viscosity of about 5 mPa*s at 25° C. and a polydispersity index of about 2. Commercially available as DMS-V05 from Gelest. |
| Vi-PDMS2 | α,ω-dimethylvinylsiloxy-terminated random copolymer of polydimethylsiloxane and polymethylvinylsiloxane with a total vinyl content of about 1.1 wt % and a zero shear viscosity of about 400 mPa*s at 25° C. and a polydispersity index of about 2 (Vi-PDMS2). Obtainable by base-catalyzed ring opening equilibrium polymerization of octamethyltetracyclosiloxane (D4) and tetramethyltetravinyltetracylcosiloxane with divinyl tetramethyldisiloxane that is subsequently neutralized, filtered and stripped of volatile dimethylsiloxanes. |
| Vi-MQ1 | trimethylsilyloxy-and dimethylvinylsilyloxy capped siloxane resin having the nominal formula $M_{0.47}M^{Vi}_{0.04}Q_{0.49}$ with a number average molecular weight of 3880 by polystyrene standards with a polydispersity index of 2.0 (Vi-MQ1). Available in solvent from Gelest as VQX-221. Obtain ViMQ1 by stripping off solvent from VQX-221. |
| Vi-MQ2 | solution comprising 73.9 wt % trimethylsilyloxy-and dimethylvinylsilyloxy- capped siloxane resin having the nominal formula M0.46MVi0.06Q0.48 with a number average molecular weight of 3900 by polystyrene standards with a polydispersity index of 2.2. Commercially available from Gelest as VQX-221 in solvent. Remove solvent as needed to achieve target solution concentration. |
| Hex-PDMS | α,ω-hexenyldimethylsiloxy-terminated random copolymer of polydimethylsiloxane and polymethylhexenylsiloxane with a total ethylenic unsaturation content of about 1.4 wt % Vinyl and a zero shear viscosity of about 400 mPa*s at 25° C. and a polydispersity index of about 2. Obtain following the procedure in US4609574A. |
| Vi-MCS1 | 99 wt % tetramethyltetravinyltetracyclosiloxane with 0.5 wt % each of pentamethylpentavinylcyclopentasiloxane and trimethyltrivinylcyclotrisiloxane. Commercially available as SIT7900.00 from Gelest. |
| Amine-functional siloxane | α,ω-aminopropyldimethylsilyl-terminated polydimethylsiloxane having a number average molecular weight of 2800 g/mol and a polydispersity index of 2.0. This polymer was made by base-catalyzed ring opening equilibrium polymerization of D4 with diaminopropyl, tetramethyldisiloxane that was subsequently neutralized, filtered and stripped of volatile dimethylsiloxanes. Materials of comparable molecular weight and functionality can be purchased commercially (e.g. Gelest DMS-A15). |
| Epoxy-functional siloxane | α,ω-3-glycidoxypropyldimethylsilyl-terminated polydimethylsiloxane having a number average molecular weight of 360 g/mol, and a polydispersity index of 2.0. Commercially available as DMS-EO9 from Gelest. |
| Amine-functional siloxane 2 | An aminopropylmethylsiloxane-dimethylsiloxane copolymer having a number average molecular weight of 4000-5000 grams per mole, polydispersity index of about 2.0 and viscosity of 100 mPa*s at 25° C. and comprising approximately 6.5 mol % of aminopropylmethylsiloxane repeat units in the backbone. Commercially available as AMS-162 from Gelest. |

TABLE 1-continued

| Material | Identity |
|---|---|
| Vi-PDMS3 | ω-dimethylvinylsiloxy-terminated polydimethylsiloxane a total vinyl content of about 0.42 wt % and a zero shear viscosity of about 450 mPa*s at 25° C. and a polydispersity index of about 2 (Vi-PDMS3). Commercially available as DMS-V25 from Gelest. |
| Vi-PDMS4 | α,ω-dimethylvinylsiloxy-terminated polydimethylsiloxane a total vinyl content of about 1.25 wt % and a zero shear viscosity of about 80 mPa*s at 25° C. and a polydispersity index of about 2 (Vi-PDMS4). Commercially available as DMS-V21 from Gelest. |

Exs 1-2: Small Polysiloxane (MM$^{vi}$)

Ex 1. Combine MMvi (0.50 g, 2.9 mmol) and MA (0.28 g, 2.9 mmol) and heat to 60° C. in chlorobenzene (6.0 g). Add 0.07 g BPO and heat to 120° C. over 30 minutes while stirring. Hold at 120° C. for 90 minutes and then cool. Dry reaction mixture under nitrogen stream to remove volatiles and solvent and reconstitute in dichloromethane to approximately the same solvent level. Load into an autosampler tray for GC-MS analysis. The chromatograph shows major and minor peaks with exact masses corresponding to the following respective assignable structures for siloxane-containing species based on mass spectrum:

Major Product:

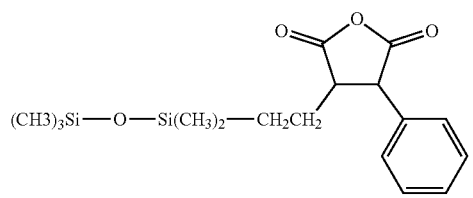

Minor Product:

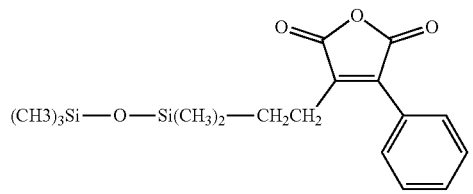

Ex 2. Repeat Ex 1 except use 6.0 g para-xylene instead of 6.0 g chlorobenzene. GC-MS analysis reveals that there are two major products and two minor products:

Major Products:

(a)

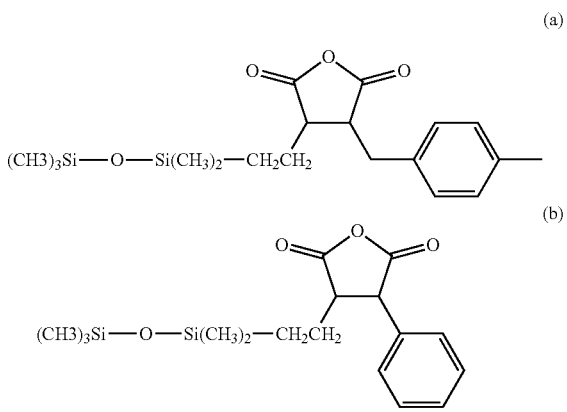

(b)

-continued

Minor Products:

(c)

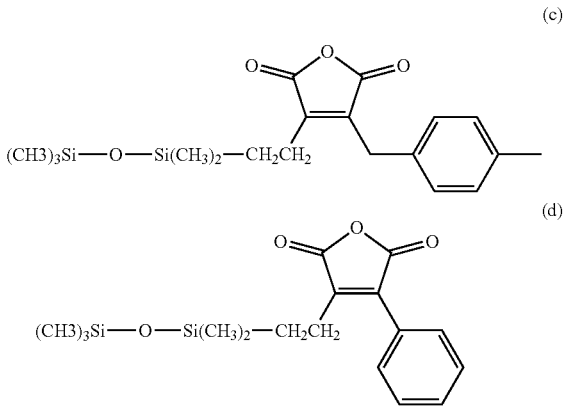

(d)

Comp Ex A and Exs 3-4: Vi-PDMS1 Reactions

Comp Ex A: Vi-PDMS1 with MA in non-aromatic solvent. Prepare a reactor assembly with a 500 milliliter (mL) three neck baffled flask, overhead stirrer, thermocouple and a temperature controller, nitrogen inlet and nitrogen outlet bubbler. Oven dry the flask. Add to the flask 200 g Vi-PDMS1 under nitrogen and allow to purge for one hour while heating to 60° C. Add 2.04 g MA and 8 g MIBK followed by 4.24 g BPO and increase stirring rate to 500 revolutions per minute. The reaction mixture heats up and increases in viscosity, reaching 118° C. in 15 minutes. The reaction mixture completely gels at 17 minutes. This result indicates that a crosslinking reaction occurs with only the MA and Vi-PDMS1.

Ex 3: Vi-PDMS1 with MA in p-xylene. Prepare a reactor assembly with a 500 milliliter (mL) three neck baffled flask, overhead stirrer, thermocouple and a temperature controller, nitrogen inlet and nitrogen outlet bubbler. Oven dry the flask. Add to the flask 60.0 g of Vi-PDMS1 under nitrogen and purge for one hour while heating to 60° C. Add 1.23 g MA and 140 g p-xylene and allow the mixture to homogenize while stirring at 300 revolutions per minute. Add 1.21 g BPO and increase stirring rate to 500 revolutions per minute. Heat the mixture to 120° C. and hold at that temperature for 90 minutes, then cool to room temperature. Remove the majority of the p-xylene using a rotary evaporator under vacuum. Transfer the product to a dry 125 mL glass jar and further dry under a stream of dry nitrogen at 110° C.

$^1$H NMR indicates that the product distribution is 50% xylyl-MAH adduct (similar to major product (a) from Ex 2 except with the Vi-PDMS1 residual instead of MM$^{vi}$ residual), 44% residual vinyl and approximately 6% unassigned product. Conversions are versus the integration of SiMe$_2$ protons on the parent Vi-PDMS1.

Ex 4: Vi-PDMS1 with MA in toluene.

To a clean, dry 500 mL round bottom 3-neck baffled flask that has been baked out in an 80° C. oven, add 199.4 g dry toluene, 40.0 g Vi-PDMS1 and 10.93 g MA. Fit the flask with a water-cooled reflux condenser. Purge the headspace of the reactor with a flow of dry nitrogen, just enough to maintain a slight positive pressure. Stir the contents with a polytetrafluoroethylene blade at 150 revolutions per minute. Monitor the temperature of the reaction solution with dual independent Type K thermocouple immersed in the reaction mixture. Heat the contents to 70° C. to allow the MA to dissolve fully. Remove a 203 mL sample of the reaction mixture. Add to the flask 8.44 g of BPO. Heat the reaction mixture to reflux at 110° C. and maintain for 3 hours with samples of reaction solution taken periodically. Allow the solution to cool to 25° C. while maintaining nitrogen purge. Evaluate the final sample by GPC for molecular weight, ATR-IR, rheometry and NMR. Results are compared to those of ViPDMS1 alone in Table 2. Perform infrared analysis using a dried film of the reaction product by heating a few drops of the sample of a glass slide with a hot air gun, then placing that film in contact with the IR crystal. IR results are compared with a reference sample of neat MA that was dissolved in methylene chloride with results in Table 3.

Results in Table 3 show a loss of vinyl groups from both the MA and Vi-PDMS1 reagents, along with the incorporation of significant quantities of —C=O groups, which is consistent with grafting of MA. This result together with results from Table 2 showing a well-controlled shift in number average molecular weight and molecular weight distribution polydispersity index, and disproportionately large 3400× increase in viscosity, along with $^{29}$Si evidence of the disappearance of M(vi) groups accompanied by the formation of MR groups indicate that significant modification of the structure and properties of the vinyl-functional siloxane is achieved by maleic anhydride and aryl functionalization according to the composition of the present invention.

TABLE 2

| | | Vi-PDMS1 | Example 4 Final Product |
|---|---|---|---|
| GPC | Mn (g/mol) | 776 | 1990 |
| | Mw/Mn | 1.68 | 1.74 |
| Rheometry | Viscosity 25° C. | 6.2 mPa*s | 21,080 mPa*s |
| | Viscosity 150° C. | (too low to measure) | 35 mPa*s |
| NMR Peak Integrals | $M^{vi}$ | 21.7 | 5.74 |
| | D | 80 | 80 |
| | $D^{H}$ | 0 | 0 |
| | $M^{R}$ | 0.05 | 14.64 |
| NMR Integral Ratios | $M^{vi}$:D | 0.2713 | 0.0718 |
| | $M^{R}$:$M^{vi}$ | 0.0023 | 2.5505 |

TABLE 3

IR Peak Height Analysis

| | =C—H | Si—CH=CH2 | —C=O | =C—H |
|---|---|---|---|---|
| Peak cm$^{-1}$ | 3118 | 3053 | 1780 | 1597 |
| Baseline Points | (3269, 2762) | (3269, 2762) | (2035, 1552) | (2035, 1552) |
| Sample | MA= | Si-Vi | MA C=O | Si-Vi |
| Vi-PDMS1 | 0.0013 | 0.0071 | 0.001 | 0.008 |
| Ex 4 | 0.0014 | 0.0037 | 0.157 | 0.004 |
| MA in methylene chloride | 0.0299 | 0.0037 | 0.495 | 0.008 |

Ex 5: Vi-PDMS1 with MA in m-Xylene

To a clean, dry 250 mL round bottom 3-neck baffled flask that has been baked out in an 80° C. oven, add 64.99 g dry m-xylene, 35.00 g Vi-PDMS1 and 9.723 g MA. Fit the flask with a water-cooled reflux condenser. Purge the headspace of the reactor with a flow of dry nitrogen, just enough to maintain a slight positive pressure. Stir the contents with a polytetrafluoroethylene blade at 150 revolutions per minute (rpm). Monitor the temperature of the reaction solution with dual independent Type K thermocouple immersed in the reaction mixture. Heat the contents to 60° C. to allow the MA to dissolve fully. Remove a 6.65 mL sample of the reaction mixture. Add to the flask 2.239 g of BPO, increase stirring speed to 200 rpm. Heat the reaction mixture to reflux at 120° C. and maintain for 2 hours with samples of reaction solution taken periodically. Allow the solution to cool to 25° C. while maintaining nitrogen purge. Evaluate the final sample by GPC for molecular weight, rheometry and water vapor sorption analysis. The resulting product was stripped at 150° C. in a rotary evaporator to remove the solvent. The resulting dried reaction product was a viscous liquid that had a zero shear viscosity of 11350 mPa*s at 25° C., significantly higher than that of the Vi-PDMS1 starting material (2 mPa*s). Notably, this Vi-PDMS1 has the same composition as that used in Ex 3, Ex 4 and Comp Ex A but is of a different batch. The difference in viscosity and molecular weight distribution reflects batch-to-batch variation in Vi-PDMS1. Despite the stark increase in viscosity, GPC showed the Mn shift was far more modest, increasing to 1410 Da (from 869 Da for Vi-PDMS1), with Mw/Mn increasing to 2.3 (from 1.5 for Vi-PDMS1). Measure Water Vapor Sorption and Hysteresis at 40° C. The dried reaction product had a wt % water vapor absorption of 1.539 wt % at 0.8 RP and 40° C., and showed significant hysteresis between the absorption and desorption steps. In contrast the unreacted Vi-PDMS1 starting material showed far less water absorption (0.099 wt % at 0.8 RP and 40° C.) and no significant hysteresis. These characterization results confirm successful functionalization of the V-PDMS1 to a polymer of the present invention.

Ex 6: Vi-PDMS1 with MA in m-Xylene at Reduced MA:Vinyl Ratio

To a clean, dry 250 mL round bottom 3-neck baffled flask that has been baked out in an 80° C. oven, add 65.04 g dry m-xylene, 35.01 g Vi-PDMS1 and 4.972 g MA corresponding to half the molar ratio of MA:vinyl groups present in Vi-PDMS3 used in Example 29 to target a lower MA grafting level. Fit the flask with a water-cooled reflux condenser. Purge the headspace of the reactor with a flow of dry nitrogen, just enough to maintain a slight positive pressure. Stir the contents with a polytetrafluoroethylene blade at 150 revolutions per minute. Monitor the temperature of the reaction solution with dual independent Type K thermocouple immersed in the reaction mixture. Heat the contents to 60° C. to allow the MA to dissolve fully. Remove a 6.65 mL sample of the reaction mixture. Add to the flask 2.146 g of BPO, increase stirring speed to 200 rpm. Heat the reaction mixture to reflux at 120° C. and maintain for 2 hours with samples of reaction solution taken periodically. Allow the solution to cool to 25° C. while maintaining nitrogen purge. Evaluate the final sample by GPC for molecular weight, rheometry and water vapor sorption analysis. The resulting product was stripped at 150° C. in a rotary evaporator to remove the solvent. The resulting dried reaction product was a viscous liquid that had a zero shear viscosity of 1424 mPa*s at 25° C., significantly higher than that of the Vi-PDMS1 starting material (2 mPa*s), but less than that of Example 5. Notably, this Vi-PDMS1 is of the same batch as the one used in Ex 5. The difference in viscosity and molecular weight distribution reflects batch-to-batch variation in Vi-PDMS1. Despite the increase in viscosity, GPC showed the Mn shift was far more modest, to 1370 Da (from 869 Da for Vi-PDMS1), with Mw/Mn increasing to 2.15 (from 1.5 for Vi-PDMS1). Measure Water Vapor Sorption and Hysteresis at 40° C. The dried reaction product had a wt % water vapor absorption of 0.878 wt % at 0.8 RP and 40° C., and showed significant hysteresis between the absorption and desorption steps. In contrast the unreacted Vi-PDMS1 starting material showed far less water absorption (0.099 wt % at 0.8 RP and 40° C.) and no significant hysteresis. The water vapor absorption level is intermediate between that of Example 29 and the unreacted Vi-PDMS1 sample, consistent with the expected reduction in grafting level of MA groups. These characterization results confirm successful functionalization of the Vi-PDMS1 to a polymer of the present invention, and further demonstrate the ability of the method of the invention to control the level of functionalization by adjusting the molar ratio of MA:vinyl groups present on the unsaturated polyorganosiloxane.

Comp Ex B and Ex 7: Vi-PDMS2 Reactions

Ex 7: Vi-PDMS2 with MA and m-xylene. To a clean, dry 250 mL round bottom 3-neck baffled flask that has been baked out in an 80° C. oven, add 80.0 g dry m-xylene, 20.0 g Vi-PDMS2 and 0.855 g MA. Fit the flask with a water-cooled reflux condenser. Purge the headspace of the reactor with a small flow of dry nitrogen to maintain a slight positive pressure. Stir the contents with a polytetrafluoroethylene blade stirrer at 150 revolutions per minute. Monitor temperature with a Type K Thermocouple immersed in the reaction mixture. Heat the flask contents to 60° C. to allow the MA to dissolve. Remove a 2-3 mL sample of the mixture and then add 1.05 g of BPO. Heat the contents to 120° C. and maintain at that temperature for 4 hours while taking 2-3 mL test samples of the solution periodically. Shut off the heat and allow to cool to 25° C. while maintaining nitrogen purge. Characterize the last test sample by GPC, ATR-IR, rheometry and NMR. Results are in Table 4. Also characterize the last test sample by NVC and compare results to Vi-PDMS2, results are in Table 5.

Comp Ex B: Vi-PDMS2 in m-xylene without MA. Repeat Ex 7 except without including the MA. Dry the resulting sample and characterize by rheometry. Despite being heated for 4 hours at 110° C. in the presence of BPO for 4 hours, the resulting sample sows no significant increase in viscosity relative to the unreacted Vi-PDMS2. This is confirmed by rheometry that shows Newtonian behavior with a viscosity of 423 mPa*s at 25° C. and 84.5 mPa*s at 150° C., representing less than 2.5% difference over the unreacted Vi-PDMS2 starting material. This is consistent with the GPC molecular weight analysis, which shows no significant changes in molecular weight or polydispersity index of molecular weight over the course of the reaction.

TABLE 4

|  |  | Vi-PDMS2 | Example 7 Final Product |
|---|---|---|---|
| GPC | Mn (g/mol) | 9680 | 11100 |
|  | Mw/Mn | 2.2 | 2.7 |
| Rheometry | Viscosity 25° C. | 414 mPa*s | 2464 mPa*s |
|  | Viscosity 150° C. | 82.7 mPa*s | 191 mPa*s |
| NMR Peak Integrals | $M^{vi}$ | 1.32 | 0.0004 |
|  | D | 80 | 80 |
|  | $D^{vi}$ | 1.58 | 0.04 |
| NMR Integral Ratios | $M^{vi}$:D | 0.165 | 0.0001 |
|  | $D^{vi}$:D | 0.098 | 0.0005 |

TABLE 5

|  | Temperature (° C.) | Relative Pressure | Ex 7 weight % change | Vi-PDMS2 Weight % change |
|---|---|---|---|---|
| Absorption | 40.0 | 0.000 | 0.000 | 0.000 |
|  | 40.0 | 0.020 | 0.059 | 0.049 |
|  | 40.0 | 0.200 | 0.107 | 0.069 |
|  | 40.0 | 0.400 | 0.158 | 0.083 |
|  | 40.0 | 0.600 | 0.232 | 0.098 |
|  | 40.0 | 0.800 | 0.432 | 0.157 |
| Desorption | 40.0 | 0.600 | 0.333 | 0.139 |
|  | 40.0 | 0.400 | 0.255 | 0.091 |
|  | 40.0 | 0.200 | 0.245 | 0.071 |
|  | 40.0 | 0.20 | 0.182 | 0.041 |

IR for Ex 7 reveals incorporation of —C═O stretching peak associated with maleic anhydride incorporation at 1786 cm$^{-1}$ that is not present in Vi-PDMS2. GC-MS reveals that free MA is removed at the drying conditions and therefore does not account for the anhydride peak, so it is anhydride that is incorporated into the polymer product. Further evidence of formation of a product of the present invention includes a 6-fold viscosity increase at 25° C., NMR evidence of disappearance of the M(vi) and D(vi) group relative to Vi-PDMS2. NVC data of Table 5 further confirms the presence of anhydride functionality in Ex 7.

Exs 8-14: Use of Branched Polysiloxane (Resin)

Ex 8. To a clean, dry 500 mL Morton style round bottom 4-neck baffled flask that had been baked out in an 80° C. oven, add 180.0 g dry toluene, 20.0 g of Vi-MQ1 and 1.38 g of MA. Fit the flask with a water-cooled reflux condenser and purge the headspace with nitrogen flow to create a slight pressure. Stir the flask contents with a polytetrafluoroethylene blade at 200 revolutions per minute. Monitor and maintain temperature with a Type K thermocouple connected to a Cole-Parmer digital programmable temperature controller. Heat the flask contents to 60° C. to allow the mA to dissolve and then remove a 2-3 mL sample. Add 8.06 g of BPO. Heat to reflux (110° C. when using toluene solvent and 120° C. when using m-xylene solvent) for 4 hours while periodically taking 2-3 mL samples. All the flask contents to cool to 25° C. while maintaining nitrogen purge. Characterize the final sample according the characterization tests listed above.

Exs 9-13. Repeat Ex 8 in a 250 mL 4-neck round Morton style baffled round bottom flask with quantities of reactants stated in Table 6.

Ex 14-21. Repeat Ex 9 except use a 73.9 wt % solution of Vi-MQ2 instead of Vi-MQ1 and use the amounts of other agents as stated in Table 6.

TABLE 6

| Example | Solvent | Solvent Mass(g) | Siloxane | Siloxane Mass(g) | MA (g) | BPO (g) |
|---|---|---|---|---|---|---|
| Ex 8 | Toluene | 180.0 | Vi-MQ1 | 20.05 | 1.38 | 8.06 |
| Ex 9 | Toluene | 80.05 | Vi-MQ1 | 20.00 | 1.42 | 4.06 |
| Ex 10 | m-xylene | 80.02 | Vi-MQ1 | 20.00 | 1.42 | 4.07 |
| Ex 11 | m-xylene | 80.00 | Vi-MQ1 | 20.00 | 1.42 | 0.41 |
| Ex 12 | m-xylene | 80.00 | Vi-MQ1 | 20.00 | 1.42 | 0.41 |
| Ex 13 | m-xylene | 50.00 | Vi-MQ1 | 50.00 | 3.54 | 2.00 |
| Ex 14 | m-xylene | 32.34 | Vi-MQ2 | 67.66 | 5.99 | 4.24 |
| Ex 15 | m-xylene | 48.04 | Vi-MQ2 | 51.96 | 5.99 | 0.16 |
| Ex 16 | m-xylene | 63.63 | Vi-MQ2 | 36.37 | 2.80 | 2.10 |
| Ex 17 | m-xylene | 48.04 | Vi-MQ2 | 51.96 | 6.00 | 4.25 |
| Ex 18 | m-xylene | 79.22 | Vi-MQ2 | 20.78 | 2.40 | 0.15 |
| Ex 19 | m-xylene | 48.04 | Vi-MQ2 | 51.96 | 2.00 | 0.15 |
| Ex 20 | m-xylene | 63.65 | Vi-MQ2 | 36.37 | 2.80 | 2.10* |
| Ex 21 | m-xylene | 64.77 | Vi-MQ2 | 35.23 | 2.80 | 2.10** |

*Ex 20 uses AIBN instead of BPO
**Ex 21 uses AMBN instead of BPO

Table 7 indicates the molecular weight and % $M^{vi}$ conversion (by $^1$H NMR) for Exs 8-14. Results show that $M^{vi}$ is consumed and molecular weight increases modestly with no crosslinking or gelation, consistent with formation of polyorganosiloxane of the present invention.

TABLE 7

| Example | Rxn Time of Sample (hours) | Mn | Mw/Mn | % $M^{vi}$ Conversion |
|---|---|---|---|---|
| 8 | 0 | 3880 | 2.05 | Not measured |
|   | 4 | 4900 | 2.50 | Not measured |
| 9 | 0 | 3880 | 2.05 | 0 |
|   | 4 | 4830 | 2.47 | 59 |
| 10 | 0 | 3880 | 2.10 | 0 |
|    | 4 | 4620 | 2.33 | 56 |
| 11 | 0 | 3950 | 2.05 | 0 |
|    | 4 | 4280 | 2.46 | 41 |
| 12 | 0 | 3870 | 2.05 | 0 |
|    | 4 | 4310 | 2.40 | 40 |
| 13 | 0 | 3870 | 2.07 | 0 |
|    | 4 | 5350 | 3.97 | 57 |
| 14 | 0 | 3900 | 2.19 | 0 |
|    | 4 | 4290 | 5.09 | 89 |

TABLE 8

| Example | Reaction Time (hours) | Mn (g/mol) | Mw/Mn | Water Vapor Sorption* | Hysteresis* |
|---|---|---|---|---|---|
| 15 | 0 | 3920 | 2.21 | 0.270 | 0.014 |
|    | Final Product | 4030 | 2.41 | 0.543 | 0.022 |
| 16 | 0 | 3910 | 2.20 | 0.270 | 0.014 |
|    | Final Product | 5130 | 3.01 | 0.538 | 0.062 |
| 17 | 0 | 3910 | 2.21 | 0.270 | 0.014 |
|    | Final Product | 5850 | 3.94 | 0.748 | 0.121 |
| 18 | 0 | 3920 | 2.21 | 0.270 | 0.014 |
|    | Final Product | 3990 | 2.33 | 0.397 | 0.066 |
| 19 | 0 | 3890 | 2.20 | 0.270 | 0.014 |
|    | Final Product | 4050 | 2.38 | 0.313 | 0.045 |
| 20 | 0 | 3830 | 2.24 | 0.270 | 0.014 |
|    | Final Product | 4050 | 2.52 | 0.671 | 0.087 |
| 21 | 0 | 3840 | 2.23 | 0.270 | 0.014 |
|    | Final Product | 4050 | 2.52 | 0.671 | 0.087 |

*Water vapor sorption at 0.9 RP and 40° C.; Hysteresis at 0.2 RP and 20° C.

The change in Mn as well as the increase water vapor sorption for Exs 15-21 are consistent with formation of a substituted polyorganosiloxane in accordance with the presently claimed invention, as is evident from the data in Table 8.

Moreover, the initial polymer for Exs 8-21 do not form films upon heating, yet the reaction product does form a film after heating further indicative of converting the resinous polyorganosiloxane into a substituted polyorganosiloxane of the present invention.

Ex 22: Hexenyl Functional Polyorganosiloxane

Repeat Ex 7, but with the following changes: instead of Vi-PDMS2 use 80.0 g hex-PDMS, use 0.99 g MA and 2.06 g of BPO.

At T=0 (prior to reaction) the polymer has a Mn of 11690 g/mol, a Mw/Mn of 2.44, a Water Vapor Sorption of 0.303 and a Hysteresis of −0.043. The final product has a Mn of 16188 g/mol, an Mw/Mn of 27.0, and a Water Vapor Sorption of 0.794 and a hysteresis of 0.212. Measure Water Vapor Sorption and Hysteresis at 0.8 RP and 40° C. The significant change in Mn, the significant increase in water vapor absorption of the final product relative to starting polymer is indicative of formation of the polymer of the present invention. The significant hysteresis indicates the hydrolysis of the anhydride functionality.

Ex 23: Cyclosiloxane

Repeat Ex 7, but with the following changes; instead of Vi-PDMS2 use a 30.0 g mixture of 99 wt % Vi-MCS1, 0.5 wt % pentamethylpentavinylcylcopentasiloxane and 0.5 wt % trimethyltrivinylcyclotrisiloxane; use 8.54 g of MA and 2.22 g of BPO.

Vi-MCS1 is too volatile to get characterization but at T=0.25 hours of the reaction the polymer has a Mn of 2800 g/mol, an Mw/Mn of 3.05. At T−0.5 hours into the reaction, the polymer has a Mn of 3730 g/mol and an Mw/Mn of 12.9, and a Water Vapor Sorption of 0.528 and a Hysteresis of 0.54 (relative to PDMS). Measure Water Vapor Sorption and Hysteresis at 0.9 RP and 40° C. and hysteresis at 0.2 RP and 20° C. The increase in Mn during the reaction indicates reaction is occurring. The Water Vapor Sorption and Hysteresis values indicate incorporation of anhydride functionality, consistent with formation of a polymer of the present invention.

Ex 24: Vi-PDMS3 with MA in m-Xylene

To a clean, dry 2 liter round bottom 3-neck baffled flask that has been baked out in an 80° C. oven, add 900.2 g dry m-xylene, 600.0 g Vi-PDMS3 and 18.31 g MA. Fit the flask with a water-cooled reflux condenser. Purge the headspace of the reactor with a flow of dry nitrogen sufficient to maintain a slight positive pressure. Stir the contents with a polytetrafluorethylene blade at 190 revolutions per minute. Monitor the temperature of the reaction solution with dual independent Type K thermocouple immersed in the reaction mixture. Heat the contents to 70° C. to allow the MA to dissolve fully. Remove a 25.71 g sample of the reaction mixture. Add to the flask 38.93 g of BPO. Heat the reaction mixture to reflux at 120° C. and maintain for 2 hours with samples of reaction solution taken periodically. Allow the solution to cool to 25° C. while maintaining nitrogen purge. Evaluate the final sample by GPC for molecular weight, ATR-IR, rheometry and NMR. The resulting product was stripped at 150° C. in a rotary evaporator to remove the solvent. The resulting dried reaction product was a viscous liquid that had a zero shear viscosity of 3030 mPa*s at 25° C., significantly higher than that of the Vi-PDMS3 starting material (450 mPa*s). 1H NMR revealed that about 70% conversion of the vinyl groups relative to the Vi-PDMS3 starting material. Measure Water Vapor Sorption and Hysteresis at 40° C. The dried reaction product had a wt % water vapor absorption of 0.26 wt % at 0.8 RP and 40° C., and showed significant hysteresis between the absorption and desorption steps. In contrast the unreacted Vi-PDMS3 starting material showed far less water absorption (0.043 wt % at 0.8 RP and 40° C.) and no significant hysteresis. These characterization results confirm successful functionalization of the V-PDMS3 to a polymer of the present invention.

Ex 25: Vi-PDMS3 with MA in m-Xylene at Reduced Stoichiometry

To a clean, dry 500 ml round bottom 4-neck baffled Morton flask that has been baked out in an 80° C. oven, add 150.1 g dry m-xylene, 100.0 g Vi-PDMS3 and 1.525 g MA, corresponding to half the molar ratio of MA:vinyl groups present in Vi-PDMS3 used in Example 24 to target a lower MA grafting level. Fit the flask with a water-cooled reflux condenser. Purge the headspace of the reactor with a flow of dry nitrogen sufficient to maintain a slight positive pressure. Stir the contents with a polytetrafluoroethylene blade at 120 revolutions per minute. Monitor the temperature of the reaction solution with dual independent Type K thermocouple immersed in the reaction mixture. Heat the contents to 60° C. to allow the MA to dissolve fully. Remove a 6.64 g sample of the reaction mixture. Add to the flask 6.45 g of BPO. Heat the reaction mixture to reflux at 120° C. and maintain for 2 hours with samples of reaction solution taken periodically. Allow the solution to cool to 25° C. while maintaining nitrogen purge. Evaluate the final sample by GPC for molecular weight, ATR-IR, rheometry and NMR. The resulting product was stripped at 150° C. in a rotary evaporator to remove the solvent. The resulting dried reaction product was a viscous liquid that had a zero shear viscosity of 1250 mPa*s at 25° C., significantly higher than that of the Vi-PDMS3 starting material (450 mPa*s), but lower than that reported in Example 24 conducted under twice the molar ratio of MA:vinyl groups present in Vi-PDMS3. 1H NMR revealed that about 30% conversion of the vinyl groups relative to the Vi-PDMS3 starting material. These characterization results confirm successful functionalization of the V-PDMS3 to a polymer of the present invention, and further demonstrate the ability to control the level of functionalization in the method of the present invention.

Ex 26: Vi-PDMS3 with MA in m-xylene using continuous process at reduced stoichiometry. To a 25 mm Coperion co-rotating twin screw extruder with an L/D of 48 is fed Vi-PDMS3 through an ISCO pump at a flow rate of 4.06 kilograms per hour (kg/hr) corresponding to a residence time of about 5 minutes in which the feed line is pre-heated with an oil-based heater to a set point of 120° C. which is the same temperature as all extruder barrels. A combination of MA, BPO pre-diluted to concentrations of 5.6 and 22.4 wt % in a mixture of p-xylene and MEK, with 22.4 wt % of the solvent being MEK, is fed through a HPLC pump into a feed port located a point 20 centimeters (cm) downstream of the Vi-PDMS3 feed port at a rate of 0.46 kg/hr. A screw rotation speed of 400 revolutions per minute (rpm) is used. The resulting dried reaction product was a viscous liquid that had a zero shear viscosity of 949 mPa*s at 25° C., significantly higher than that of the Vi-PDMS3 starting material (450 mPa*s), while the GPC showed only a modest 14% increase in the number average molecular weight ($M_n$) with little change in polydispersity (weight-average molecular weight divided by number average molecular weight, or "$M_w/M_n$") of 2.69. 1H NMR revealed about 36% conversion of the vinyl groups relative to the Vi-PDMS3 starting material. These characterization results demonstrate an embodiment of the method of the present invention in which a continuous method of production is utilized to produce a polymer of the present invention.

Ex 27: Vi-PDMS3 with MA in m-Xylene Using Continuous Process at Reduced Stoichiometry To a 25 mm Coperion co-rotating twin screw extruder with an L/D of 48 is fed Vi-PDMS3 through an ISCO pump so that the total mass flow rate through the extruder is 2.03 kg/hr corresponding to a residence time of about 10 minutes in which the feed line is pre-heated with an oil-based heater to a set point of 140° C. which is the same temperature as all extruder barrels. A combination of MA, BPO pre-diluted to concentrations of 5.6 and 22.4 wt % in a mixture of p-xylene and MEK, with 22.4 wt % of the solvent being MEK, is fed through a HPLC pump into a feed port located a point 20 cm downstream of the Vi-PDMS3 feed port at a rate of 0.24 kg/hr. A screw rotation speed of 200 rpm is used. The resulting dried reaction product was a viscous liquid that had a zero shear viscosity of 1167 mPa*s at 25° C., significantly higher than that of the Vi-PDMS3 starting material (450 mPa*s), while the GPC showed only a modest 16% increase in the $M_n$ with little change in $M_w/M_n$ (2.52). 1H NMR revealed about 32% conversion of the vinyl groups relative to the Vi-PDMS3 starting material. These characterization results further demonstrate an embodiment of the method of the present invention in which a continuous method of production is utilized to produce a polymer of the present invention Comp Ex C: Vi-PDMS3 Blank Using Continuous Process The conditions used for Example 26 are repeated in the same Coperion 25 mm twin screw extruder, feeding Vi-PDMS3 through an ISCO pump at a flow rate of 4.54 kg/hr in which the feed line is pre-heated with an oil-based heater to a set point of 120° C. which is the same temperature as all the extruder barrels. However, no reagents, initiator or solvent are added to the downstream injection port. Evaluate the final sample by GPC for molecular weight, rheometry and NMR. The resulting material was a liquid that had a zero shear viscosity of 455 mPa*s at 25° C., virtually unchanged relative to the Vi-PDMS3 starting material (450 mPa*s). 1H NMR reveals 0% conversion of the vinyl groups relative to the Vi-PDMS3 starting material and GPC shows no statistically significant change in the $M_n$ nor in the $M_w/M_n$ of the polymer relative to Vi-PDMS3 starting material. These characterization results confirm that the continuous extrusion process has no effect of its own on the Vi-PDMS3, and the embodiments of the method of the present invention exemplified in Examples 26 and 27 are responsible for producing the polymer of the present invention.

Ex. 28. Vi-PDMS4 with MA in m-Xylene

To a clean, dry 500 ml round bottom 3-neck baffled flask that has been baked out in an 80° C. oven, add 150.2 g dry m-xylene, 150.00 g Vi-PDMS4 and 9.22 g MA. Fit the flask with a water-cooled reflux condenser. Purge the headspace of the reactor with a flow of dry nitrogen sufficient to maintain a slight positive pressure. Stir the contents with a polytetrafluorethylene blade at 190 revolutions per minute. Monitor the temperature of the reaction solution with dual independent Type K thermocouple immersed in the reaction mixture. Heat the contents to 70° C. to allow the MA to dissolve fully. Remove a 5.0 g sample of the reaction mixture. Add to the flask 6.30 g of BPO. Heat the reaction mixture to reflux at 120° C. and maintain for 2 hours with samples of reaction solution taken periodically. Allow the solution to cool to 25° C. while maintaining nitrogen purge. Evaluate the final sample by GPC for molecular weight, ATR-IR, rheometry and NMR. The resulting product was stripped at 90° C. in a vacuum oven to remove the solvent. The resulting dried reaction product was a viscous liquid that had a zero shear viscosity of 9370 mPa*s at 25° C., significantly higher than that of the Vi-PDMS4 starting material (61.8 mPa*s). 1H NMR revealed about 67% conversion of the vinyl groups relative to the Vi-PDMS4 starting material. Measure Water Vapor Sorption and Hysteresis at 40° C. The dried reaction product had a wt % water vapor absorption of 1.25 wt % at 0.8 RP and 40° C., and showed significant hysteresis between the absorption and desorption steps. In contrast the unreacted Vi-PDMS4 starting material showed far less water absorption (0.054 wt % at 0.8 RP and 40° C.) and no significant hysteresis. These characterization results confirm successful functionalization of the V-PDMS4 to a polymer of the present invention.

Exs 29-33: Curable Compositions

The following examples illustrate curable compositions comprising polyorganosiloxanes of the present invention Ex 29. Into a polypropylene mixing cup add 1.543 g of Ex 17, 1.020 g of the amine-functional siloxane (see Table 1). Immediately place the mixture into a rotary centrifugal mixer for 20 seconds at 3000 revolutions per minute. The mixture is warm upon removing from the mixer and appears as a clear, yellow tinted non-flowable elastomeric gel. Ex 29 demonstrates a curable composition comprising a polyorganosiloxane of the present invention (Ex 17) that can rapidly crosslink an amine-functional siloxane polymer in ambient conditions. Place the gel sample in a vacuum oven and dry under vacuum at 80° C. for 3 hours to remove solvent. The resulting material is a clear, tack-free yellow tinted elastomer with excellent mechanical toughness.

Ex 30. Into a polypropylene mixing cup add 2.189 g of Ex 17 and 1.039 g of the amine-functional siloxane (see Table 1). Immediately place the mixture into a rotary centrifugal mixer for 20 seconds at 3000 revolutions per minute. The mixture is warm upon removing from the mixer and appears as a clear, yellow tinted non-flowable elastomeric gel. Ex 30 demonstrates a curable composition comprising a polyorganosiloxane of the present invention (Ex 17) that can rapidly crosslink an amine-functional siloxane polymer in ambient conditions.

Ex 31. Into a polypropylene mixing cup add 0.584 g of Ex 17 and 0.043 g of the epoxy-functional siloxane (see Table 1). Immediately place the resulting mixture into a rotary centrifugal mixer for two 20 second mixing cycles at 3000 revolutions per minute. The resulting mixture is a clear, low viscosity mixture and remained so for approximately 24 hours. After 13 days at 25° C. and approximately 50% relative humidity the sample becomes a hard, clear water-white elastomer with no surface tack.

Ex. 32. Into a polypropylene mixing cup add 1.006 g of the dried polymer from Ex 24 and 0.179 g of Amine Functional Siloxane 2. Immediately place the mixture into a rotary centrifugal mixer for 30 seconds at 3000 revolutions per minute. The mixture appears as a clear, yellow tinted lightly crosslinked, non-flowable elastomeric gel that would snap back when stretched and probed with a spatula. After leaving at room temperature for 9 days, the sample is a less tacky flexible clear elastomer with a glossy surface and a light yellow tint that can be removed from the mixing cup in one piece.

Ex 33. Into a polypropylene mixing cup add 1.004 g of the dried polymer from Ex 24 and 0.466 g of Amine Functional Siloxane 2. Immediately place the mixture into a rotary centrifugal mixer for 30 seconds at 3000 revolutions per minute. The mixture appears as a clear, faint orange tinted non-flowable elastomeric gel that had greater stiffness and less elongation than the elastomer sample of Ex 31. After leaving at room temperature for 9 days, the sample is a less tacky flexible clear elastomer with a light yellow tint that can be removed from the mixing cup in one piece.

What is claimed is:

1. A polyorganosiloxane having an anhydride functionality and an aromatic functionality, wherein a carbon of the aromatic functionality is separated from a carbon of a carbonyl group of the anhydride functionality by a carbon chain, wherein the polyorganosiloxane contains 5 weight-percent or more silicon atoms based on weight of the polyorganosiloxane; and wherein the anhydride functionality and the aromatic functionality are on the same pendant group extending from a single silicon atom of the polyorganosiloxane, with only one anhydride functionality and only one aromatic functionality on the pendant group and with the aromatic functionality being more remote from the silicon atom along the pendant group than the anhydride functionality.

2. The polyorganosiloxane of claim 1, wherein the carbon chain separating is two non-aromatic carbons or more and three non-aromatic carbons or less.

3. The polyorganosiloxane of claim 1, wherein the anhydride is a cyclic anhydride.

4. The polyorganosiloxane of claim 1, wherein the aromatic functionality is monocyclic.

5. A process for making the polyorganosiloxane of claim 1, the process comprising: (a) forming a reactive composition by combining (i) an unsaturated polyorganosiloxane, (ii) an unsaturated anhydride compound; (iii) a free radical initiator and/or photoinitiator; and (iv) a solvent; and (b) initiating a free radical reaction by triggering the free radical initiator and/or photoinitiator; wherein the solvent is an aromatic compound that has an alpha-hydrogen atom and/or wherein the free radical initiator and/or photoinitiator is aromatic.

6. The process of claim 5, wherein the unsaturated polyorganosiloxane is a vinyl functional polyorganosiloxane.

7. The process of claim 5, wherein the unsaturated anhydride compound is maleic anhydride or a substituted maleic anhydride.

8. The process of claim 5, wherein the solvent is an aromatic solvent that is one or a combination of more than one selected from a group consisting of toluene, xylene isomers, ethylbenzene and trimethylbenzene isomers.

9. A curable composition comprising: (a) the polyorganosiloxane of claim 1; and (b) an organopolysiloxane containing an average of at least two silicon-bonded amine or two-silicon bonded epoxy groups per molecule.

* * * * *